Jan. 23, 1940.  K. L. JOHNSON  2,187,974
BRACKET FOR COFFEE BREWING VESSELS
Filed Dec. 10, 1937
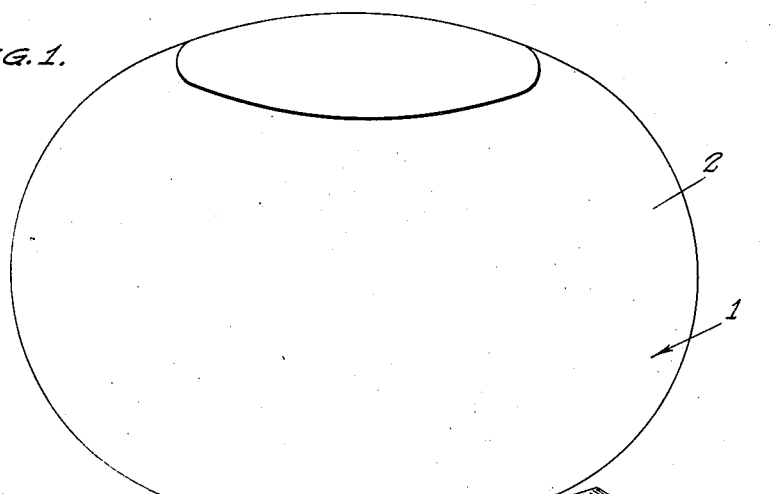
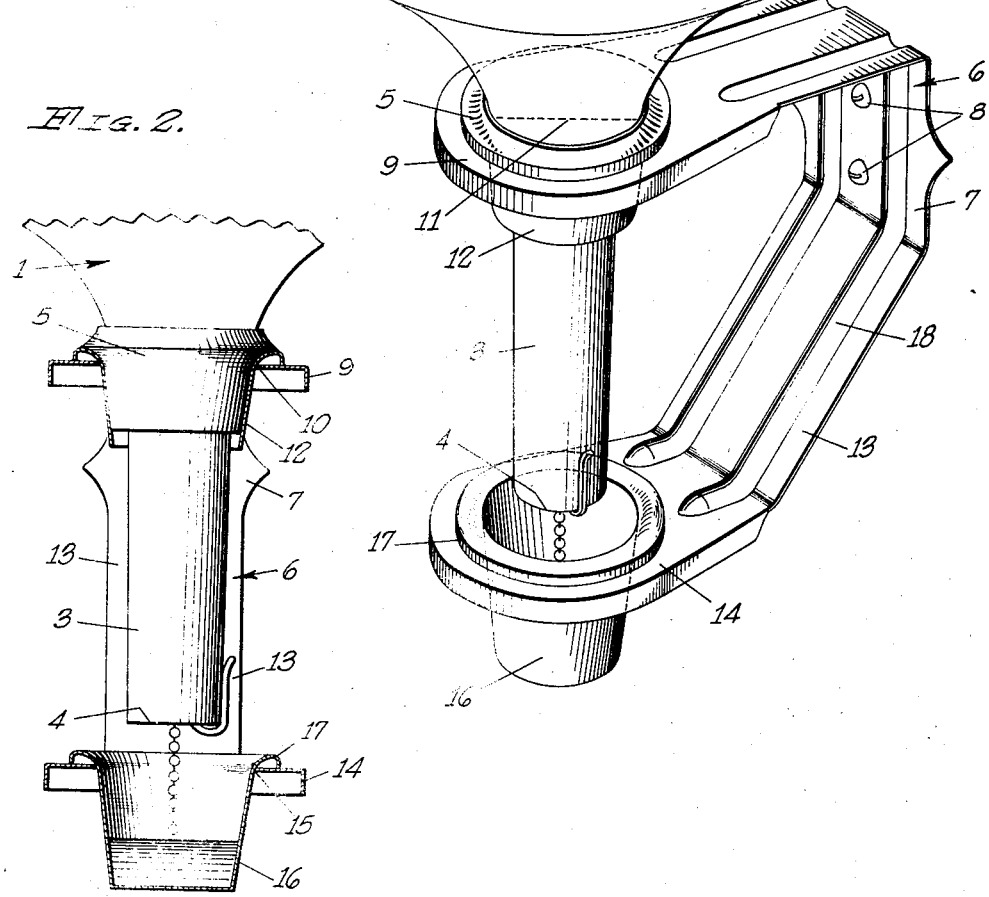
INVENTOR
KARL L. JOHNSON
BY
ATTORNEY

Patented Jan. 23, 1940

2,187,974

UNITED STATES PATENT OFFICE 2,187,974

BRACKET FOR COFFEE BREWING VESSELS

Karl L. Johnson, Los Angeles, Calif.

Application December 10, 1937, Serial No. 179,118

1 Claim. (Cl. 65—65)

My invention relates to brackets for coffee makers and has particular reference to a bracket which may be readily employed to support the brewing vessel when the same is not in use in the heating vessel to thereby prevent accidental displacement or breakage thereof.

In the operation and use of coffee makers which employ a pot or water heating vessel and a brewing vessel having a relatively long neck adapted to be inserted into the water heating vessel, the disposition of the brewing vessel after the coffee has been made presents a considerable problem, particularly in the ordinary home kitchen. The usual brewing vessels are found and are made of relatively thin glass or similar material which is extremely fragile so that should the housewife lay the brewing vessel upon the surface of a table or drainboard, it is likely to roll thereon, contacting other articles which may be supported upon the table or drainboard, or may roll completely therefrom and frequent breakage of such vessels occurs.

Also upon the removal of the brewing vessel from the pot some liquid usually remains in the vessel which continues to drip from the neck or stem thereof, which makes the handling and disposition of the vessel messy.

It is therefore an object of my invention to provide a bracket which may be secured upon a wall or cupboard or other article of furniture at or near the place at which coffee is to be made with such apparatus, the bracket being provided with means for readily supporting the brewing vessel without danger of accidental displacement and breakage thereof.

Another object of my invention is to provide a bracket of the character set forth wherein the bracket is provided with a drain cup which will be disposed below the mouth or open end of the stem of the brewing vessel to receive any drippings therefrom and to permit their ready collection and disposal.

Another object of my invention is to provide a bracket of the character set forth wherein a pair of arms are provided projecting one above the other, the upper arm having an opening therein through which the stem of a coffee brewing vessel may be placed while a drain cup may be located in the other arm in a position immediately below the open mouth of the vessel when so supported in the bracket.

Another object of my invention is to provide a bracket of the character set forth wherein the upper arm is provided with an opening adapted to snugly engage the usual rubber or similar cover employed upon the stems of coffee brewing vessels so as to provide a gripping seat snugly and securely holding the coffee brewing vessel in place in the bracket.

Other objects and advantages of my invention will be apparent from a study of the following specification, read in connection with the accompanying drawing, wherein Fig. 1 is a perspective view of a bracket constructed in accordance with my invention and illustrating the manner in which the stem may be held to support a coffee brewing vessel; and Fig. 2 is a vertical sectional view taken through the openings in the arms of the bracket illustrated in Fig. 1.

Referring to the drawing, I have illustrated in Fig. 1 a coffee brewing vessel 1 of a type commonly employed in coffee making machines, said vessel usually comprising a relatively large bowl-like body 2 from which extends a tubular stem 3, the lower end or mouth 4 of which is open, the stem 3 being surrounded near its junction with the bowl 1 by a collar 5 of rubber or similar material which permits relative sealing between the stem of the brewing vessel 2 and the water heating vessel or pot (not shown) with which the coffee brewing vessel is employed.

To readily support the coffee brewing vessel 1 when not in use in the water heating vessel or pot, I provide a bracket 6 which may be constructed of any suitable material having a body portion 7 provided with a flat surface adapting the same to be readily attached to a wall, cupboard or other similar article of furniture as by means of screws 8. From the upper end of the body 7 an upper arm 9 projects forwardly of the body member 7 and is provided with an opening or hole 10 disposed in a horizontal plane and extending through its outer end, the length of the arm 9 and the location of the opening 10 relative to the body 7 being such as will readily accommodate the diameter of the bowl portion of the brewing vessel 1; that is, the distance from the center 11 of the hole 10 and the rear surface of the body portion 7 should be somewhat in excess of the horizontal radius of the bowl portion 2. The opening or hole 10 may be and preferably is lined with a skirt member 12 comprising a tapered tubular member attached to the arm 9 and extending through the opening 10, the skirt member 12 having an internal shape conforming with the external shape of the collar 5, the collars 5 usually tapering inwardly and downwardly relative to the stem 3 of the brewing vessel, and I prefer that the skirt member 12 be provided with an internal taper corresponding in dimensions to the taper of the collar 5 so that when the stem 3 of the coffee brewing vessel is inserted through the hole 10 and skirt 12, the skirt 12 will form a seat snugly engaging the collar 5 and holding the brewing vessel securely in place upon the bracket.

The body member 7 is also preferably provided with a lower arm 13 which has a forwardly projecting portion 14 extending immediately below and in alignment with the upper arm 9, the projecting or extending portion 14 being provided with a suitable hole or opening 15 therein disposed immediately below and in alignment with the upper arm 9, the projecting or extending portion 14 being provided with a suitable hole or opening 15 therein disposed immediately below and in alignment with the hole or opening 10. The upper and lower arms 9 and 13 are preferably so spaced from each other as to dispose the opening 15 somewhat below the open mouth 4 of the stem 3 when the coffee brewing vessel is supported in the opening 10. A removable cup member 16 may be provided, adapted to be inserted into the hole or opening 15 in the lower arm 13, so as to provide a drain cup or receptacle into which any residue of liquids in the brewing vessel 1 may drip and there be collected and disposed of.

One form of cup 16 is illustrated herein as having its upper edge 17 flanged outwardly as indicated in Fig. 2 so as to rest upon the upper surface of the extension 14 of the lower arm to provide a means for readily supporting the cup in place within the opening 15 and yet permit its ready removal from the opening.

While I have illustrated the bracket 6 herein as being constructed of relatively thin sheet metal which may be stamped, pressed or otherwise fashioned into the shape illustrated and described herein, and which may be provided with reinforcing ribs 18 to lend rigidity thereto, it will be apparent that this bracket may be constructed of other materials and by other processes and methods of fashioning.

It will be observed therefore that I have provided a bracket for supporting the brewing vessel of coffee making machines which may be readily and economically constructed and which provides a safe receptacle for the coffee brewing portion of the machines when they are not in actual coffee making use, the brackets supporting the brewing apparatus in such manner as to prevent accidental displacement or droppage thereof and providing a clean and sanitary receptacle for any drippings which may come from the same.

While I have shown and described the preferred embodiment of my invention, I do not desire to be limited to any of the details of construction shown or described herein, except as defined in the appended claim.

I claim:

In a bracket for supporting coffee brewing vessels which have a container portion and a stem extending therefrom and surrounded by a gasket disposed on said stem, the combination of: a bracket body including a vertically extending portion and an upper bracket arm formed integrally therewith and extending substantially horizontally; an opening in said upper bracket arm; a skirt member extending about said opening and having a shape conforming with the external shape of the gasket on said stem for receiving said stem and engaging said gasket for supporting said coffee brewing vessel and maintaining said stem thereof in a substantially vertical position; a lower bracket arm formed integrally with said bracket body and spaced below said upper bracket arm a distance exceeding the length of said stem; and means on said lower bracket arm supporting a drip cup in vertical alignment with the lower end of said stem and spaced downwardly therefrom.

KARL L. JOHNSON.